US010259919B2

United States Patent
Huang et al.

(10) Patent No.: US 10,259,919 B2
(45) Date of Patent: Apr. 16, 2019

(54) PERCHLORATE ION PERMSELECTIVE MEMBRANES

(71) Applicant: UNIVERSITY OF DELAWARE, Newark, DE (US)

(72) Inventors: Chin-Pao Huang, Hockessin, DE (US); Po-Yen Wang, Broomall, PA (US)

(73) Assignee: UNIVERSITY OF DELAWARE, Newark, DE (US)

( * ) Notice: Subject to any disclaimer, the term of this patent is extended or adjusted under 35 U.S.C. 154(b) by 139 days.

(21) Appl. No.: 15/509,717

(22) PCT Filed: Sep. 2, 2015

(86) PCT No.: PCT/US2015/048060
§ 371 (c)(1),
(2) Date: Mar. 8, 2017

(87) PCT Pub. No.: WO2016/040067
PCT Pub. Date: Mar. 17, 2016

(65) Prior Publication Data
US 2017/0306115 A1    Oct. 26, 2017

Related U.S. Application Data

(60) Provisional application No. 62/047,774, filed on Sep. 9, 2014.

(51) Int. Cl.
*C08J 5/22*    (2006.01)
*B01D 61/44*    (2006.01)
(Continued)

(52) U.S. Cl.
CPC ............ *C08J 5/2231* (2013.01); *B01D 61/44* (2013.01); *B01D 71/30* (2013.01); *B01D 71/82* (2013.01);
(Continued)

(58) Field of Classification Search
CPC ..... C08J 5/2231; C08J 2327/06; B01D 61/44; B01D 71/30; B01D 71/82; B01D 2325/42; C02F 1/4693
(Continued)

(56) References Cited

U.S. PATENT DOCUMENTS 5,236,570 A    8/1993  Ma et al.
6,461,491 B1   10/2002 Hryn et al.
(Continued)

FOREIGN PATENT DOCUMENTS

EP    0300364 A2 *  1/1989  ......... G01N 27/3335
EP    0300364 A2     1/1989
(Continued)

OTHER PUBLICATIONS

Wegmann D. et al. "Anion-Selective Liquid Membrane Electrodes Based on Lipophilic Quaternary Ammonium Compounds", Mikrochimica Acta [Wien] 1984 III, pp. 1-16 (Year: 1984).*
(Continued)

*Primary Examiner* — Michael Bernshteyn
(74) *Attorney, Agent, or Firm* — RatnerPrestia

(57) ABSTRACT

A membrane having permselectivity for perchlorate ion is prepared using certain types of quaternary ammonium salts contained in a polymeric matrix material, which may be plasticized. Such membranes are useful in electrodialysis processes, whereby perchlorate-contaminated aqueous compositions are purified.

19 Claims, 12 Drawing Sheets

(51) Int. Cl.
  *B01D 71/30* (2006.01)
  *B01D 71/82* (2006.01)
  *C02F 1/46* (2006.01)
  *C02F 1/469* (2006.01)
(52) U.S. Cl.
  CPC ........ *C02F 1/4693* (2013.01); *B01D 2325/42* (2013.01); *C08J 2327/06* (2013.01)
(58) Field of Classification Search
  USPC .......................................................... 521/27
  See application file for complete search history.

(56) References Cited

U.S. PATENT DOCUMENTS

| | | | |
|---|---|---|---|
| 7,632,406 | B2 | 12/2009 | Wilson et al. |
| 2005/0006237 | A1 | 1/2005 | Larkin et al. |
| 2005/0072690 | A1 | 4/2005 | Fyles et al. |
| 2005/0252857 | A1 | 11/2005 | Wilson et al. |
| 2012/0312688 | A1* | 12/2012 | Berthelot ........... B01D 67/0093 204/520 |
| 2013/0306482 | A1 | 11/2013 | Yang et al. |
| 2014/0102980 | A1 | 4/2014 | Moe et al. |
| 2015/0166375 | A1 | 6/2015 | Freydina et al. |

FOREIGN PATENT DOCUMENTS

| | | | |
|---|---|---|---|
| WO | 2006061082 A1 | 6/2006 | |
| WO | WO-2006061082 A1 * | 6/2006 | ............. B01D 53/58 |

OTHER PUBLICATIONS

International Search Report and Written Opinion for International Application No. PCT/US2015/048060, dated Dec. 10, 2015—8 Pages.
International Preliminary Report on Patentability, dated Mar. 14, 2017—7 Pages.
Wegmann D., et al, Anion-Selective Liquid Membrane Electrodes Based on Lipophilic Quaternary Ammonium Compounds Mikrochimica Acta [Wein] 1984 III, pp. 1-16.

* cited by examiner

Figure 5.

Table 1. Chemical Structure of Quaternary Ammonium Salts

| Name | Structure |
|---|---|
| Tetramethylammonium chloride (TMA) | |
| Tetraethylammonium chloride (TEA) | |
| Tetrapropylammonium chloride (TPA) | |
| (1-hexyl)trimethylammonium bromide (HTMA) | |
| (n-Octyl)trimethylammonium bromide (OTMA) | |
| (1-Dodecyl)trimethylammonium bromide (DDTMA) | |
| Cetyltrimethylammonium bromide (CTMA) | |

| | |
|---|---|
| Benzyltributylammonium chloride (BTBA) |  |
| Benzyltrimethylammonium bromide (BTMA) |  |
| Benzyldimethylhexadecylammonium chloride (BDMHA) |  |
| Methyltributylammonium chloride (MTBA) |  |
| Methyltrioctylammonium chloride (MTOA) |  |

Figure 6.

Table 2. Characterization of Various Membranes

| Types of Membrane | q | θ | δ | $r_p$ | Σ |
|---|---|---|---|---|---|
| PVC only | 0.03±0.01 | 73.6±1.1 | 3.21±0.06 | 40.3 | 0.23 |
| TMA | 0.09±0.02 | 73.8±0.6 | 4.49±0.63 | 87.7 | 0.60 |
| TEA | 0.10±0.00 | 77.1±0.7 | 4.03±0.47 | 82.9 | 0.79 |
| TPA | 0.08±0.00 | 52.6±2.5 | 3.32±1.73 | 77.7 | 0.49 |
| MTBA | 0.12±0.00 | 77.4±1.1 | 3.23±2.58 | 83.6 | 0.51 |
| BTBA | 0.11±0.01 | 74.4±0.8 | 4.60±0.39 | 83.3 | 0.46 |
| BDMHA | 0.10±0.02 | 74.1±0.9 | 3.79±1.04 | 78.8 | 0.52 |
| MTOA | 0.06±0.01 | 39.0±2.4 | 11.07±1.79 | 79.8 | 0.55 |
| BTMA | 0.15±0.00 | 71.8±3.4 | 3.18±1.34 | 90.6 | 0.35 |
| HTMA | 0.08±0.01 | 47.6±3.6 | 21.30±5.76 | 79.5 | 0.61 |
| OTMA | 0.09±0.01 | 62.6±2.7 | 41.28±4.48 | 79.6 | 0.54 |
| DDTMA | 0.09±0.00 | 54.4±3.4 | 3.72±0.70 | 81.7 | 0.51 |
| CTMA | 0.13±0.01 | 3.7±0.5 | 17.07±4.72 | 86.7 | 0.48 | q : Ion exchange capacity (meq/g)
θ: Contact angle (degree)
δ: Roughness (nm)
$r_p$ : Average pore radius (Å)
Σ: Specific Surface Area (m$^2$/g)

Figure 7.

Table 3. Rate constants of anions passed through various membranes in electrodialysis separation (n = 3)

| | $k_1$ ($10^{-3}h^{-1}$) | | | | $k_2$ ($10^{-3}h^{-1}$) | | | |
|---|---|---|---|---|---|---|---|---|
| | $NO_3^-$ | $HCO_3^-$ | $SO_4^{2-}$ | $ClO_4^-$ | $NO_3^-$ | $HCO_3^-$ | $SO_4^{2-}$ | $ClO_4^-$ |
| TMA | 60±3 | 61±20 | 64±3 | 93±27 | 350±78 | 0±0 | 711±155 | 193±61 |
| TEA | 39±2 | 96±7 | 26±2 | 146±34 | 31±15 | 1307±777 | 0±0 | 2±1 |
| TPA | 32±7 | 38±4 | 25±3 | 97±40 | 64±44 | 0±0 | 0±0 | 5±4 |
| MTBA | 27±6 | 57±17 | 41±20 | 127±5 | 145±32 | 0±0 | 403±82 | 128±15 |
| BTBA | 31±5 | 46±19 | 35±18 | 95±24 | 101±67 | 0±0 | 213±80 | 0±0 |
| BDMHA | 39±13 | 73±13 | 28±7 | 167±13 | 24±22 | 0±0 | 0±0 | 10±8 |
| MTOA | 161±51 | 65±34 | 101±38 | 162±35 | 123±83 | 0±0 | 748±56 | 20±5 |
| BTMA | 65±18 | 69±22 | 50±5 | 169±6 | 484±68 | 0±0 | 1971±673 | 58±3 |
| HTMA | 40±16 | 86±2 | 42±17 | 80±31 | 109±51 | 0±0 | 945±343 | 227±35 |
| OTMA | 53±27 | 41±9 | 28±2 | 127±32 | 0±0 | 0±0 | 0±0 | 0±0 |
| DDTMA | 68±26 | 139±7 | 37±17 | 154±30 | 53±8 | 1135±230 | 295±9 | 13±1 |
| CTMA | 48±14 | 43±18 | 27±1 | 163±25 | 0±0 | 0±0 | 0±0 | 0±0 |

PERCHLORATE ION PERMSELECTIVE MEMBRANES

CROSS-REFERENCE TO RELATED APPLICATIONS

This application is the national phase of International Application No. PCT/US2015/048060, filed 2 Sep. 2015, which claims priority from U.S. Provisional Application No. 62/047,774, filed 9 Sep. 2014, the entire disclosure of each of which is incorporated herein by reference in its entirety for all purposes.

STATEMENT OF GOVERNMENT FUNDING

The present invention was made with government support under Grant No. CBET0965984, awarded by the National Science Foundation. The government has certain rights in this invention.

FIELD OF THE INVENTION

The present invention pertains to membranes that are capable of selectively separating perchlorate ions from aqueous compositions.

BACKGROUND OF THE RELATED ART

Perchlorate is an emerging inorganic contaminant, at least in the United States. It has been reported that perchlorate is present at detectable concentrations in public drinking water supplies affecting more than 11 million people in the United States. Both natural and anthropogenic origins are contributing sources of perchlorate in the environment. Through the intake of perchlorate-containing food or water, perchlorate ions can be transported to the thyroid gland and cause adverse effects on the metabolism and production of thyroid hormones. The National Academy of Science has recommended a perchlorate reference dose (RfD) of 0.7 µg/kg-day. Perchlorate is already regulated in California and Massachusetts drinking water with the maximum contaminant level (MCL) of 6 and 2 µg/L, respectively. In February 2011, the U.S. EPA expressed the government's intent to establish a national primary drinking water regulation (NPDWR) for perchlorate. Therefore, methods that are effective in eliminating perchlorate from water are needed.

Due to the highly soluble, non-volatile and kinetically inert nature of perchlorate ion in water, the elimination of perchlorate from contaminated water is a challenging task. Many efforts have been made to develop efficient techniques for the removal of perchlorate from water. Among the various chemical and physical processes, granular activated carbon (GAC) and ion exchange resins have received much attention as methods for perchlorate removal. Although adsorption processes can be effective for the removal of perchlorate at trace concentrations in water, such processes require regeneration of the adsorbents or ultimate disposal of perchlorate-laden spent adsorbent materials. Furthermore, competitive and inhibitory adsorption of other anions against perchlorate can be a technology barrier for such adsorption processes. Membrane technologies such as ultrafiltration (UF) and nanofiltration (NF) have also been used to remove perchlorate from water. However, the lack of selectivity and the use of chemicals (polymers) make such methods unattractive. It would therefore be desirable to develop additional, improved methods for removing perchlorate from water.

SUMMARY OF THE INVENTION

The invention provides a polymeric membrane having the capability of separating low concentrations of perchlorate ion from water in the presence of other anions, such as nitrate, sulfate and bicarbonate, under an electric field (i.e., in an electrodialysis process). The perchlorate permselective membrane may be prepared using a polymeric matrix material such as polyvinyl chloride (PVC), specific quaternary ammonium salts and optionally one or more other additives such as plasticizer. The PVC provides the physical frame of the membrane; that is, the PVC imparts mechanical strength and integrity to the membrane, within which are contained the quaternary ammonium salts (which contribute to the ion selectivity of the membrane) and plasticizer (which contributes to the necessary dielectric characteristics of the membrane structure). Once fabricated using the aforementioned components, the membrane may be placed between cathode and anode chambers in an electrodialysis apparatus, along with one or more cation exchange membranes. An aqueous composition comprising dissolved perchlorate ions is introduced to the cathode chamber. A direct current may then be applied through electrodes (e.g., graphite electrodes) in the electrodialysis apparatus. Using the permselective membrane of the present invention, perchlorate ions selectively pass through the membrane to the anode chamber, with the other anions (nitrate, sulfate, bicarbonate) remaining substantially in the cathode chamber. In some embodiments of the invention, it is possible to separate 60-80% of perchlorate from a solution containing 1 ppm each of perchlorate, nitrate and sulfate and 10 ppm bicarbonate (4 hours at room temperature with a current of 1 mA), whereas only 10-30% of the nitrate ions, 10-35% of the sulfate ions and/or less than 5% of bicarbonate ions were separated.

Thus, the perchlorate ion permselective membrane of the present invention is capable of concentrating or separating perchlorate ion from aqueous compositions at high selectivity. The successful selective concentration and separation of perchlorate ions from water can enable the further detoxification of perchlorate using an electrochemical method (that is, a stream containing the separated or concentrated perchlorate can be subjected to electrochemical treatment whereby the perchlorate is chemically transformed to a non-toxic chloride species, wherein such transformation takes place under ambient temperature, pressure and pH conditions and at low perchlorate concentration).

In one embodiment, the present invention provides an apparatus for treatment of a fluid that includes perchlorate ions, wherein the apparatus comprises a porous membrane containing a polymeric matrix material and particular quaternary ammonium salts contained therein and a system for producing an electrical charge across the membrane. The quaternary ammonium salt is selected so as to facilitate the selective transport of perchlorate through the membrane, in preference to other anions, when an electrical charge is applied (between two electrodes, for example, whereby the perchlorate ions migrate towards the anode). In another embodiment, the present invention provides a method for treating a fluid that includes perchlorate ions. The method comprises the steps of providing a membrane comprised of a polymeric matrix material and one or more of particular species of quaternary ammonium salts and producing an electrical charge across the membrane in contact with the fluid. The membrane has characteristics, including pore size, such that perchlorate ions from the fluid are preferentially transferred through the membrane towards an anode, whereby other anions present in the fluid pass through the membrane either not at all or at a slower rate than perchlorate. Thus, the present invention operates to perform functions such as perchlorate removal, water purification, and selective ion transportation. The membranes of the present invention provide selective, targeted removal of perchlorate from aqueous compositions. A perchlorate-rich stream thus may be produced by operation of the present invention, thereby facilitating destruction or disposal of the perchlorate contaminant in drinking water supplies or the like in an cost effective manner.

Various exemplary, non-limiting embodiments of the present invention may be described as follows:

First Embodiment

A membrane useful for selectively separating perchlorate ions from aqueous compositions, comprising at least one polymeric matrix material and at least one quaternary ammonium sat, wherein the at least one quaternary ammonium salt is a salt of a quaternary ammonium having four alkyl groups attached to a nitrogen atom and wherein the four alkyl groups are the same or different and contain a total of 12 to 14 carbon atoms, subject to the proviso that none of the alkyl groups individually contain more than six carbon atoms.

Second Embodiment

A membrane in accordance with the First Embodiment, wherein the at least one polymeric matrix material includes at least one vinyl chloride polymer.

Third Embodiment

A membrane in accordance with the First Embodiment, wherein the at least one polymeric matrix material includes a homopolymer of vinyl chloride.

Fourth Embodiment

A membrane in accordance with any of the First through Third Embodiments, wherein the at least one quaternary ammonium salt is a halide salt.

Fifth Embodiment

A membrane in accordance with any of the First through Fourth Embodiments, wherein the at least one quaternary ammonium salt is a chloride or bromide salt.

Sixth Embodiment

A membrane in accordance with any of the First through Fifth Embodiments, wherein the at least one quaternary ammonium salt includes one or more quaternary ammonium salts selected from the group consisting of tetrapropylammonium chloride and methyltributylammoniunn chloride.

Seventh Embodiment

A membrane in accordance with any of the First through Sixth Embodiments, wherein the membrane is additionally comprised of at least one plasticizer.

Eighth Embodiment

A membrane in accordance with the Seventh Embodiment, wherein the at least one plasticizer includes at least one non-phthalate plasticizer.

Ninth Embodiment

A membrane in accordance with the Seventh Embodiment, wherein the at least one plasticizer includes tributyl O-acetyl citrate.

Tenth Embodiment

A membrane in accordance with any of the First through Ninth Embodiments, comprising 30 to 40 weight % vinyl chloride polymer, 55 to 65 weight % plasticizer, and 2 to 10 weight % quaternary ammonium salt.

Eleventh Embodiment

A membrane in accordance with any of the First through Tenth Embodiments, wherein the membrane has a thickness of 0.12 to 0.60 mm.

Twelfth Embodiment

A membrane in accordance with any of the First through Eleventh Embodiments, wherein the membrane has an averaged pore radius of 70 to 95 angstroms.

Thirteenth Embodiment

A membrane in accordance with any of the First through Twelfth Embodiments, wherein the membrane has an ion exchange capacity of at least 0.05 meq/g, e.g., 0.05 to 0.20 meq/g or greater.

Fourteenth Embodiment

An electrodialysis unit useful for removing perchlorate from an aqueous composition, comprising a membrane in accordance with any of the First through Thirteenth Embodiments and a system for producing an electrical charge across the membrane.

Fifteenth Embodiment

An electrodialysis unit in accordance with the Fourteenth Embodiment, wherein the system for producing an electrical charge across the membrane comprises an anode and a cathode.

Sixteenth Embodiment

An electrodialysis unit in accordance with the Fourteenth or Fifteenth Embodiment, additionally comprising a first cation exchange membrane positioned between the anode and the membrane in accordance with any one of the First through Thirteenth Embodiments and a second cation exchange membrane positioned between the cathode and the membrane in accordance with any one of the First through Thirteenth Embodiments.

Seventeenth Embodiment

An electrodialysis unit in accordance with the Sixteenth Embodiment, comprising one or more electrode stacks, each electrode stack including two electrodes and one or more cation exchange membranes and anion exchange membranes alternately arranged between the two electrodes, at least one of the anion exchange membranes being a membrane in accordance with any one of the First through Thirteenth Embodiments.

Eighteenth Embodiment

A method for separating perchlorate from an aqueous composition comprised of perchlorate, wherein the method comprises placing the aqueous composition in contact with a surface of the membrane in accordance with any one of the First through Thirteenth Embodiments in the electrodialysis unit of any one of the Fourteenth through Seventeenth Embodiments and applying a current between the anode and the cathode.

Nineteenth Embodiment

A method of making a membrane in accordance with any one of the First through Thirteenth Embodiments, comprising forming a layer of a solution comprised of quaternary ammonium salt, polymeric matrix material and, optionally, plasticizer on a surface of a substrate and drying the layer to obtain the membrane.

BRIEF DESCRIPTION OF THE DRAWINGS

FIG. 2a PVC only (no quaternary ammonium salt); FIG. 2b TMA; FIG. 2c CTMA; FIG. 2d BTMA; FIG. 2e MTOA; and FIG. 2f MTBA membranes. Experimental Condition: [PVC]=34.5%; [$R_4N^+X^-$]=5.7%; [TBOAC]=59.8%; THF=10 mL; scale bar=10 μm.

FIG. 6 contains a table listing characteristics of various membranes.

FIG. 7 contains a table showing the rate constants measured for anions passed through various membranes in electrodialysis separation.

DETAILED DESCRIPTION OF CERTAIN EMBODIMENTS OF THE INVENTION

Figure 1A:
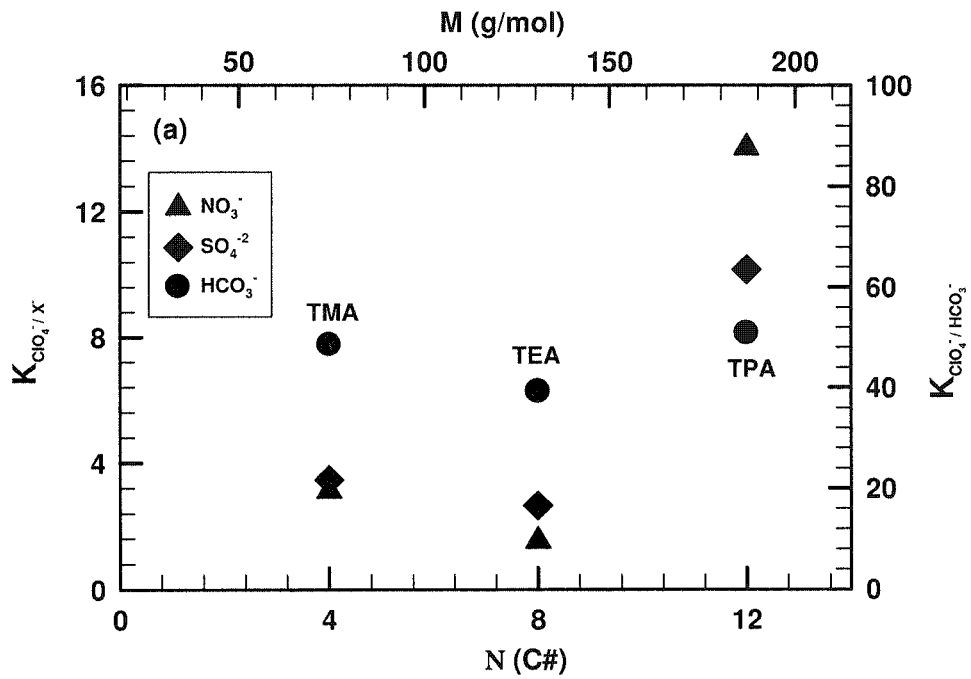
FIG. 1a symmetric amines.

It has been discovered that the permselectivity of a membrane towards perchlorate ion is highly dependent upon the structure of the quaternary ammonium salt used to prepare the membrane. In particular, it has been found that the highest perchlorate selectivity can be achieved when the quaternary ammonium salt is a salt of a quaternary ammonium having four alkyl groups attached to a nitrogen atom and wherein the four alkyl groups are the same or different and contain a total of 12 to 14 carbon atoms, subject to the proviso that none of the alkyl groups individually contain more than six carbon atoms. The membrane may contain a single species of such a quaternary ammonium salt, but in certain embodiments mixtures of two or more different such quaternary ammonium salts are utilized. The anionic portion of the quaternary ammonium-compound may be any suitable species, but may advantageously be a halide such as chloride or bromide. The quaternary ammonium portion of the salt may correspond to the formula $R^1R^2R^3R^4N$, wherein $R^1$, $R^2$, $R^3$ and $R^4$ ore the same as or different from each other and are each a C1 to C6 alkyl group (subject to the proviso that the quaternary ammonium moiety contains a total of 12, 13 or 14 carbon atoms). The alkyl groups are preferably straight chain alkyl groups, but branched alkyl groups or a combination of straight chain and branched alkyl groups may also be suitably used. For example, the alkyl groups may be methyl, ethyl, n-propyl, iso-propyl, n-butyl and isomers thereof, n-pentyl and isomers thereof or n-hexyl and isomers thereof. The use of methyltributyl ammonium salts, in particular methyltributyl ammonium chloride or bromide is especially advantageous, but examples of other suitable quaternary ammonium salts include ethyltributyl ammonium chloride, tetrapropyl ammonium chloride, butyltripropyl ammonium chloride, pentyltripropyl ammonium chloride, diethyldibutyl ammonium chloride, and hexyltriethyl ammonium chloride and the bromide counterparts thereof.

The amount of quaternary ammonium salt in the membrane is selected to be sufficient to impart the desired perchlorate selectivity and other characteristics to the membrane. Typically, the membrane contains at least 0.5 wt % quaternary ammonium salt, but in other embodiments quaternary ammonium salt comprises at least 1 wt %, at least 1.5 wt %, at least 2 wt %, at least 2.5 wt %, at least 3 wt %, at least 3.5 wt % or at least 4 wt % of the membrane. The amount of quaternary ammonium salt in the membrane typically is not greater than 20 wt %. In various embodiments of the invention, the membrane does not comprise greater than 19 wt %, greater than 18 wt %, greater than 17 wt %, greater than 16 wt %, greater than 15 wt %, greater than 14 wt %, greater than 13 wt %, greater than 12 wt %, greater than 11 wt %, greater than 10 wt %, greater than 9 wt %, or greater than 8 wt %. In various embodiments of the invention, the type and amount of quaternary ammonium salt present in the membrane are selected so that the membrane has an averaged pore radius of at least 50 angstroms but no greater than 120 angstroms (e.g., 70-95 angstroms) and/or an ion exchange capacity of at least 0.01 meq/g (e.g., 0.05-0.20 meq/g).

The quaternary ammonium salt is dispersed or dissolved in a polymeric matrix material, preferably a polymeric matrix material that is plasticized with one or more plasticizers. Although generally speaking any film-forming polymer or combination of film-forming polymers may be used as the polymeric matrix material, a vinyl chloride polymer such as polyvinyl chloride (PVC) is employed as the polymeric matrix material in one especially advantageous embodiment of the invention. The vinyl chloride polymer may be a homopolymer of vinyl chloride or a copolymer of vinyl chloride with one or more comonomers (such as vinyl acetate, vinylidene chloride or olefins). Chlorinated PVC may also be used. However, other suitable polymers include homopolymers and copolymers of ethylenically unsaturated monomers such olefins, dienes, vinyl monomers, fluorinated olefins, unsaturated esters and the like as well as polycondensation polymers such as polyesters, polyamides, polyurethanes and the like. In one embodiment, the polymeric matrix material is thermoplastic. In another embodiment, the polymeric matrix material is soluble in at least one organic solvent but insoluble in water.

In general, an amount of polymeric matrix material is included in the membranes of the present invention which is sufficient to provide the membranes with the desired or necessary mechanical, electrochemical and physical properties. Typically, such amount is at least 20 wt % of the membrane, but in various embodiments of the invention the polymeric matrix material may constitute at least 15 wt %, at least 25 wt %, or at least 30 wt % of the membrane. In general, the amount of polymeric matrix material is not more than 95 wt %, not more than 90 wt %, not more than 85 wt %, not more than 80 wt %, not more than 75 wt %, not more than 70 wt %, not more than 65 wt %, not more than 60 wt %, not more than 55 wt %, or not more than 50 wt % of the membrane. In embodiments of the invention in which the membrane is comprised of polyvinyl chloride, quaternary ammonium salt and plasticizer, the amount of polyvinyl chloride may advantageously be between 30 wt % and 40 wt %; such amounts have been found to provide membranes having relatively high permselectivity towards perchlorate.

A plasticizer, or combination of plasticizers, may additionally be present in the membrane to improve or enhance certain properties of the membrane. When the polymeric material is a vinyl chloride resin such as PVC, the use of plasticizer is especially advantageous. Any of the plasticizers known in the art may be employed, including both phthalate and non-phthalate plasticizers.

Suitable plasticizers include, but are not limited to, lipophilic alkyl and aryl alcohols, ethers, esters, phosphates, and diphosphonates. The plasticizer may be an ester of a polycarboxylic acid with linear or branched aliphatic alcohols. Phthalates, adipates, citrates, sebacates, maleates, oleates, isostearates, trimellitates, and the like are all suitable for use. Such plasticizers include, without limitation, dioctyl phthalate, dioctyl sebacate, dioctyl adipate, dibutyl sebacate, dibutyl phthalate, 1-decanol, 5-phenyl-1-pentanol, tetraundecyl benzhydrol 3,3',4,4' tetracarboxylate, benzyl ether, dioctylphenyl phosphonate, tris(2-ethylhexyl) phosphate, isopropyl palmitate, isopropyl isostearate, diisooctyl phthalate, dicapryl adipate, di-n-hexyl azelate, o-nitrophenyl octyl ether and fluorophenyl nitrophenyl ether. Tributyl O-acetyl citrate is an example of an especially advantageous non-phthalate plasticizer, particularly where the polymeric matrix material is based on polyvinyl chloride. In selecting a plasticizer(s) for the polymeric membrane, it is desirable that the plasticizer be compatible with the polymeric matrix material.

The quantity of plasticizer present in the membrane will depend upon the type of polymer used as the polymeric matrix material as well as the particular characteristics and properties of the finished membrane that may be desired. For example, the membrane may comprise at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt % plasticizer or even more. Generally speaking, however, the amount of plasticizer present in the membrane does not exceed 90 wt % and in other embodiments does not exceed 85 wt %, 80 wt %, 75 wt %, 70 wt % or 65 wt %.

Membranes in accordance with the invention are typically employed in the form of relatively thin flat sheets and may be prepared, for example, by combining the polymeric matrix material, quaternary ammonium salt and plasticizer in a solvent (or combination of solvents) capable of dissolving the polymeric matrix material. The resulting solution may then be cast into a thin film by depositing a layer of the solution on a substrate surface and then drying the deposited layer to remove solvent and thereby form the membrane. The choice of solvent will depend upon the type of polymeric matrix material employed, but suitable solvents include such organic solvents as tetrahydrofuran and dimethylformamide. The thin film can be cut to size for use in an electrodialysis apparatus, of the type further described below.

Membranes in accordance with the present invention may also be obtained using extrusion methods, which may be practiced with or without solvent.

Typically, the parameters of the aforementioned methods (concentration of the polymeric matrix material, quaternary ammonium salt and plasticizer in the solvent, thickness of the applied layer(s), extrusion die dimensions, etc.) are controlled so that the thickness of the resulting membrane is at least 0.1 mm but no greater than 1 mm. In various embodiments of the invention, the membrane has a thickness of 0.12 mm to 0.60 mm or 100 to 500 microns.

Membranes in accordance with the present invention may be used in free-standing form or may be supported on other materials or may be in the form of laminate films together with one or more other types of membranes.

The membranes of the present invention are advantageously used in electrodialysis units for removing perchlorate ions from aqueous compositions. Electrodialysis is a process in which ions are transported from one solution through a membrane to another solution under the influence of an applied electric potential difference. Such a process may be carried out in a configuration which may be referred to as an electrodialysis cell. The cell may comprise a feed (dilute) compartment and a concentrate compartment formed by an anion exchange (anion permeable) membrane (such as a membrane in accordance with the present invention) placed between two electrodes. Typically a cation exchange membrane or two cation exchange membranes is/are also placed between the two electrodes. The membranes of the present invention may be utilized in any of the configurations commonly referred to in the art as an electrolysis stack. Such electrodialysis devices have at least one anode and at least one cathode as well as a respective membrane electrolysis stack arranged between an anode and a cathode. Each membrane electrolysis stack comprises membranes stacked on top of each other and respective electrolyte compartments arranged therebetween. Thus, such an electrodialysis apparatus is an array of alternating anion-selective and cation-selective membranes terminated by electrodes. The membranes may be separated from each other by gaskets which form fluid compartments. A membrane in accordance with the present invention may be employed as the anion-selective membrane. Enrichment and depletion compartments alternate through the array. Openings in the gaskets and membranes register with each other to provide two pairs of hydraulic manifolds to carry fluid into and out of the compartments, one pair communicating with the depletion compartments and the other with the enrichment compartments. A direct electric current is applied between the cathode and anode, causing anions to move through the anion-selective membrane(s). The membrane of the present invention permits Perchlorate ions to selectively pass through the membrane in the direction of the anode, while largely preventing other anions (nitrate, bicarbonate, sulfate) from doing so.

In an electrolysis stack, a dilute feed stream, a concentrate stream and an electrode stream may be allowed to flow through the appropriate cell compartments formed by multiple ion exchange membranes (at least one of which may be a membrane in accordance with the present invention). The dilute feed stream may be, for example, an aqueous composition contaminated with perchlorate and possibly other species. The electrode stream flows past each electrode in the stack and may comprise, for example, a sodium chloride (NaCl) solution. Under the influence of an electrical potential difference, the perchlorate anions in the dilute stream migrate towards the positively charged anode. The perchlorate passes through the membrane in accordance with the present invention, but is prevented from further migration toward the anode by a cation exchange membrane and therefore stays in the concentrate stream, which becomes concentrated with the perchlorate anions. The overall result of such an electrodialysis process is an increase in perchlorate species concentration in the concentrate stream and a depletion of perchlorate species in the dilute solution feed stream (i.e., the concentration of perchlorate is reduced; in certain embodiments, all or substantially all of the perchlorate initially present in the dilute solution feed stream is eliminated, thereby yielding a purified aqueous composition). Perchlorate is selectively removed from the dilute stream in preference to other anionic species such as nitrate, sulfate and bicarbonate that may be present. The concentrate stream obtained by operation of such an electrodialysis process, which is enriched in perchlorate, may subsequently be treated by some method for converting perchlorate into more innocuous substances or otherwise disposed of. The purified aqueous composition may be used for drinking or other purposes where a reduced level of perchlorate is desirable or necessary.

Various exemplary uses of membranes in accordance with the present invention are as follows.

In one embodiment, an apparatus for treatment of water containing perchlorate ions to remove perchlorate from the water is provided, wherein the apparatus comprises a water source containing perchlorate ions, a cathode, an anode, a voltage source connected to the cathode and the anode, and a membrane in accordance with the present invention. The water is directed along a surface of the membrane and is in contact with such surface. The perchlorate ions in the water are drawn toward the anode and selectively permeate through the membrane and into a fluid that is on the opposite side of the membrane, when an electric field is produced by the cathode, anode and voltage source such that a positive charge is placed on the anode and a negative charge is placed on the cathode. As the apparatus is operated, the fluid that is on the opposite side of the membrane becomes enriched in perchlorate while the water containing perchlorate ions becomes depleted in perchlorate. A cation permeable membrane may be placed between the cathode and the membrane in accordance with the present invention and between the anode and the membrane in accordance with the present invention. Such cation permeable membrane may be separate from the cathode or anode or may be in the form of a coating on the surface of the cathode or anode.

In another embodiment, an apparatus for treatment of water containing perchlorate ions to remove perchlorate from the water is provided, wherein the apparatus comprises a water source containing perchlorate ions, a cathode, an anode, a voltage source connected to the cathode and anode, and a layered stack of membranes. The layered stack of membranes includes cation permeable membranes and anion permeable membranes, which may be arranged in an alternating manner, wherein at least one membrane in the layered stack is a membrane in accordance with the present invention. An electrical potential gradient may be placed across the entire membrane stack and used to drive ions through the membranes. The apparatus further comprises a system for directing fluid between the cation permeable membranes and the anion permeable membranes. When the water containing perchlorate ions is brought into contact with a surface of a membrane in accordance with the present invention in such a layered stack and the voltage source is operated such that a positive charge is produced on the anode and a negative charge is placed on the cathode, the perchlorate ions in the water are drawn towards the anode for removal. Due to the structure and composition of the membrane in accordance with the present invention, perchlorate ions pass more readily through the membrane than other anions present in the water, such as nitrate, sulfate and bicarbonate. Selective removal of the perchlorate ions is thereby accomplished.

EXAMPLES

Materials and Methods
Chemicals and Reagents

All chemicals were either of analytical or reagent grade, or the highest purity available from suppliers. All aqueous solutions were prepared with de-ionized, distilled water, tetrahydrofuran (THF, HPLC grade, Fisher Scientific, Fair Lawn, N.J., USA), polyvinyl chloride (PVC, MP Biomedicals, Solon, Ohio, USA) and tributyl O-acetylcitrate (TBOAC, 98%, Aldrich, St, Louis, Mo., USA) were used for the synthesis of the membranes. Tetramethylammonium chloride (TMA, 98+%) tetraethylammonium chloride (TEA, 99%), tetrapropylammonium chloride (TPA, 94%), benzyldimethylhexadecylammonium chloride (BDMHA, 97%), benzyltributylammonium chloride (BTBA, 98+%), methyltributylammonium chloride (MTBA, 98%) and methyltrioctylammonium chloride (MTOA) were purchased from Acres Organics (NJ, USA). (n-Octyl)trimethylammonium bromide (OTMA, 97%), (1-hexyl)trimethylammonium bromide (HTMA, 98%) and (1-dodecyl)trimethylammonium bromide (DDTMA, 97%) were purchased from Alfa Aesar (Ward Hill, Mass., USA). Cetyltrimethylammonium bromide (CTMA, 98-101% and benzyltrimethylammonium bromide (BTMA) were obtained from Avocado Research Chemicals (Heysham, UK).

The certified standard anions solution (1000 mg/L) of nitrate ($NO_3^-$), perchlorate ($ClO_4^-$) and sulfate ($SO_4^{2-}$) were purchased from SPEX CertiPrep (Metuchen, N.J., USA).

Sodium perchlorate (ACS reagent, >98%, Sigma-Aldrich, St. Louis, Mo., USA), sodium bicarbonate (analytical grade ACS, 99.7%), sodium chloride (reagent grade ACS, >99%), sodium nitrate (analytical grade ACS, >99%) from Acros Organics, sodium carbonate (HPLC grade), sodium sulfate (certified ACS) from Fisher Scientific were individually dissolved into deionized water to prepare stock solutions. NaOH (50% w/w, Fisher Scientific, Fair Lawn, N.J., USA) was used as mobile phase solution in ion chromatography analysis.

Preparation of Membranes

Membranes were prepared by dissolving a given amount of polyvinyl chloride (PVC), TBOAC, and quaternary ammonium salt in 10 mL of tetrahydrofuran (THF) solvent at room temperature at a weight percentage of 34.5, 59.8 and 5.7%, respectively. TBOAC is regarded as a relatively nontoxic material as compared with phthalate plasticizer and therefore may be advantageously used as a substitute for phthalate plasticizer in PVC polymer. A total of 12 different quaternary ammonium salts, namely, TMA, TEA, BDMHA, TPA, BTBA, MTBA, MTOA, BTMA, HTMA, OTMA, DDTMA and CTMA were studied for the purpose of identifying the membrane with the best perchlorate selectivity. A K Hand Coater (40, 100, 150, 300 μm, RK PrintCoat Instrument Ltd., UK) was used to control the thickness of the membrane. The membrane solution was poured on a substrate (100 circles, diameter 9 cm), followed by drawing the bar coater with both hands at a steady speed to coat a layer of solvent on the surface of the substrate. After the solvent was evaporated under room temperature, the membrane was formed on the surface of the substrate.

Chemical and Physical Characterization

The membranes were characterized for pertinent chemical and physical properties, including permselectivity, ion exchange capacity, functional groups, contact angle, surface roughness, pore size and specific surface area.

The performance of preferential permeation of specific ions by membrane separation can be evaluated by permselectivity constant, $K_{A,B}$, between two ions (A and B) defined as the following Eq. 1:

$$K_{A,B} = \frac{\mu_A \overline{C}_A C_B}{\mu_B \overline{C}_B C_A} \quad (1)$$

where $\mu_A$, $\mu_B$ are the mobility of ion A and B in the membrane phase (cm$^2$/(V-s)); $\overline{C}_A$, $\overline{C}_B$ and $C_A$, $C_B$ are the concentration of ion A and B in the membrane phase (eq/cm$^3$) and in the solution phase of the desalting side (eq/cm$^3$), respectively. If the value of $K_{A,B}$ is greater than unity, it implies that ion A is more permeable than ion B through the membrane. In this study, the permselectivity constants between ions through the membrane were measured in a 2-compartment electrodialytic cell. The membrane was placed between the two compartments, which were filled with the appropriate mixed salt solutions (for example, sodium perchlorate and sodium nitrate solution). Electrodialysis was then carried out at a constant current density for a given period of time (about 4 hours) to reach steady-state transport condition at a constant temperature. The solutions were vigorously stirred during electrodialysis to minimize diffusion. The concentrations of anions in both compartments were analyzed in the beginning, middle and the end of electrodialysis. The concentration of the anions in the membrane can also be calculated from the mass balance relationship. The permselectivity constants can be determined according to Eq. 1.

The ion exchange capacity of the membrane was determined using a back titration method and calculated by the following equation (2):

$$q=(N*V)/W \quad (2)$$

where q is the ion exchange capacity (eq/g dry wt), N is the normality of titrant, NaOH (eq/L), V is volume (L) of the titrant added to the membrane-containing solution at the end point, and W is the dry weight of membrane (g).

A contact angle goniometer (Ramé-hart Instrument Co., NJ, USA) was used to characterize the wettability of the membranes by the sessile drop method. Contact angles of different types of membrane were measured before and after perchlorate exchange experiments. The membranes (area about 0.5 cm$^2$) were placed under the microscope. A droplet (~5 μL) of DIW was placed on the membranes to measure the angle between the liquid and membrane interface. Contact angles (θ) were determined by taking the average of five measurements.

The pore size of membrane was determined with nitrogen adsorption/desorption method using a BET pore size analyzer (NOVA 2000, Quantchrome Corp., USA). Three grams of each membrane sample were pretreated under nitrogen purging and vacuum environment in a glass cell at 303° K for 24 h. The sample with glass cell was then placed in a liquid nitrogen bottle to initiate nitrogen gas adsorption and desorption over the pressure range of 38 to 760 mmHg. Based on the volume of nitrogen gas adsorbed the average pore size, $r_p$, of membrane was calculated according to the following equation:

$$V_{liq} = \frac{P_a V_{ads} \tilde{V}_m}{RT} \quad (3)$$

$$r_p = \frac{2 V_{liq}}{\Sigma} \quad (4)$$

where $V_{liq}$ is the volume (cm$^3$/g) of liquid nitrogen occupying the pores, $P_a$ and T are pressure and temperature, respectively, $\tilde{V}_m$ is the molar volume of the liquid adsorbate (i.e., 34.7 cm$^3$/mol for nitrogen), $V_{ads}$ is the volume of nitrogen adsorbed (cm$^3$/g), and $\Sigma$ is the specific surface area (cm$^2$/g).

The morphology of membrane surface was studied using an atomic force microscope (AFM, Bioscope Catalyst, Bruker Corp., USA). The membranes were (area about 2 cm$^2$) placed under the microscope without fluid and the tip of a probe (ScanAsyst-Air, Bruker Corp.) was engaged to the samples in direct contact mode. The surface roughness (δ) of each membrane sample was determined by taking the average of three measurements.

The surface functional groups of membrane were detected with Fourier transform infrared (FTIR) spectrometer (Thermo Nicolet NEXUS 670, Thermo Scientific Inc., USA) coupled with attenuated total reflectance (ATR) method from wavenumber 600 to 3500 cm$^{-1}$ of each membrane sample. The membrane images were obtained by scanning electron microscope (JSM 7400F, JEOL Ltd., USA JSM7400). Metal (Pd, Au) sputtering deposition on the surface of membrane samples under vacuum were carried out before imaging.

Perchlorate and Other Anions Separation Studies

The synthesized membranes were placed in an electrodialysis device for perchlorate separation studies. The concentration of perchlorate and other anions, namely, chloride, sulfate, bicarbonate, carbonate, and nitrate were analyzed by ion chromatography. A Dionex DX500 (CA, USA) ion chromatography system was equipped with Dionex AS40 auto-sampler and the guard column (IonPac AG16, 50 mm×4 mm) and analytical column (IonPac AS16, 250 mm×4 mm).

The transport kinetics of anions across the membrane can be expressed by following equations (5)-(7):

$$\frac{d[A_d]}{dt} = -k_1[A_d] \quad (5)$$

$$\frac{d[A_m]}{dt} = k_1[A_d] - k_2[A_m] \quad (6)$$

$$\frac{d[A_c]}{dt} = -k_2[A_m] \quad (7)$$

where $[A_d]$, $[A_m]$, $[A_c]$ is the mass of the anion in the diluate, membrane phase and concentrate chamber, respectively. $k_1$ is the rate constant of anion transport from the diluate to the membrane surface and $k_2$ is the rate constant of anion transport from the membrane surface to the concentrate chamber. In the absence of other chemical reactions involving the anions of interest, the following mass balance equation can be written as:

$$[A_d]+[A_m]+[A_c]=[A_T] \quad (8)$$

where $[A_T]$ is the total mass of ion in the system. By combining eq. (5) through eq. (8), and upon integration, one has:

$$[A_d] = [A_T]e^{-k_1 t} \quad (9)$$

$$[A_m] = [A_T] \times \frac{k_1}{k_2 - k_1}(e^{-k_1 t} - e^{-k_2 t}) \quad (10)$$

$$[A_c] = [A_T] \times \left(1 + \frac{(k_1 e^{-k_2 t} - k_2 e^{-k_1 t})}{(k_2 - k_1)}\right) \quad (11)$$

By monitoring the ion concentration in the diluate and concentrate streams, it s possible to obtain the rate constants of km transport, $k_1$ and $k_2$.

Results and Discussion
Membrane Thickness

PVC membranes were synthesized in this study due to their flexibility and durability. The thickness of ion exchange membrane would influence the ion flux across the membrane. It is expected that thinner membranes would facilitate ion flux due to smaller resistance. The thickness of PVC membranes was controlled by the amount of polymeric solution used. The $K_{ClO_4^-,HCO_3^-}$ value remained large at ~30 and independent of the membrane thickness whereas both $K_{ClO_4^-,NO_3^-}$ and $K_{ClO_4^-,SO_4^{2-}}$ values increased from <1 to >1 with the thickness of the membrane. Prior workers have shown that large anions such as sulfate, in general, permeate through membranes with difficulty, especially those having a highly crosslinked structure. Although the PVC polymer used here was of linear structure without crosslinkage, thicker membranes still could hamper the transport of ions. It is worth noting that perchlorate permselectivity versus bicarbonate ($K_{ClO_4^-,HCO_3^-}$) remains almost constant over the range of membrane thickness studied, which indicates that other factors might affect the transport of the ions as well. The mobility (u) of a ion at infinite dilution can be calculated via the following equation:

$$u = \frac{ZeD}{k_B T} \quad (12)$$

where Z is the valence of the ion, e is the charge of the electron ($1.62 \times 10^{-19}$ C), D is the diffusion coefficient of the ion ($cm^2 s^{-1}$), $k_B$ is Boltzmann constant ($1.38 \times 10^{-23}$ $m^2$ kg $s^{-2} K^{-1}$), and T is temperature (K). The calculated mobilities of $SO_4^{2-}$, $NO_3^-$, $ClO_4^-$ and $HCO_3^-$ are 8.29, 7.40, 6.98 and 4.61 ($10^{-8}$ $m^2 V^{-1} s^{-1}$) respectively at 298° K. Consequently the mobility of bicarbonate ion will be relatively smaller than that of all other ions. Therefore, the slow-moving bicarbonate ion would pass through the membrane at slower rate. However, in order to maintain appropriate structural strength, a certain thickness is necessary. Most of commercial anion exchange membranes have typical thickness in the range from 0.12 to 0.60 mm. Hence, a thickness around 0.3 mm was selected. At this thickness, both the $K_{ClO_4^-,NO_3^-}$ and $K_{ClO_4^-,SO_4^{2-}}$ values were greater than unity favoring the permselectivity of perchlorate over that of nitrate and sulfate.

Polymer Mass Content

Altering the amount of PVC polymer in a membrane is believed to closely relate to the ion selectivity. Therefore, the effect of the chemical composition of the membrane on perchlorate permselectivity was examined in terms of polymer mass content. Membranes were prepared by mixing different amounts of PVC (e.g., 20.83, 25.97, 30.5 and 34.5 wt %) while keeping the amounts of quaternary ammonium salt (MTBA) and TBOAC at 0.1 and 1.04 g, respectively. By plotting perchlorate permselectivity against other anions, $X=NO_3^-$, $SO_4^{2-}$, $HCO_3^-$, ($K_{ClO_4^-,X^-}$) versus the PVC weight percentage, PVC (wt %), it was found that the perchlorate permselectivity against nitrate ($K_{ClO_4^-,NO_3^-}$) and sulfate ($K_{ClO_4^-,SO_4^{2-}}$) reached ~30 as the amount of PVC was increased from 20.83 to 34.5 wt %. Again, the value of $K_{ClO_4^-,HCO_3^-}$ almost remained unchanged (~35) due to kinetically slow-moving bicarbonate ion. These results indicated that PVC has favorable perchlorate permselectivity characteristics and that the amount of polymer did control the perchlorate permselectivity of the membrane. It has previously been reported that ion exchange membranes of denser texture would be more ion-selective. Furthermore, comparing the hydration radius of the anions studied, i.e., $ClO_4^-$ (2.40 Å)>$SO_4^{2-}$ (2.30 Å)>$NO_3^-$(1.96 Å)>$HCO_3^-$ (1.56 Å), it is seen that structurally dense membranes are more effective in hindering the direct transport of ions. Previously, it had been reported that decreasing the UF membrane pore size led to lowering the ion flux across the membrane and increasing overall perchlorate rejection. Therefore, a structurally dense membrane would prevent the smaller ions, e.g., nitrate, from passing through the membrane. The transport of the ion of interest, e.g., perchlorate, could be exclusively driven by its affinity toward the functional groups on the membrane structure.

A membrane prepared with an optimum amount of PVC and thickness could have homogeneous structure, which enables effective transport of ions through the membrane via ion exchange process. However, the electrical conductivity of the membrane also decreased as the amount of polymer and the membrane thickness increased. Under constant current operation in the electrodialysis experiments, voltage drop across the membrane was increased from 31.4 to 112.4V when the membrane thickness was increased from 0.04 to 0.3 mm. Therefore, membranes were prepared with 34.5 wt % of PVC polymer and a thickness of 0.3 mm in the present research.

Chemical Properties

Figure 1B:
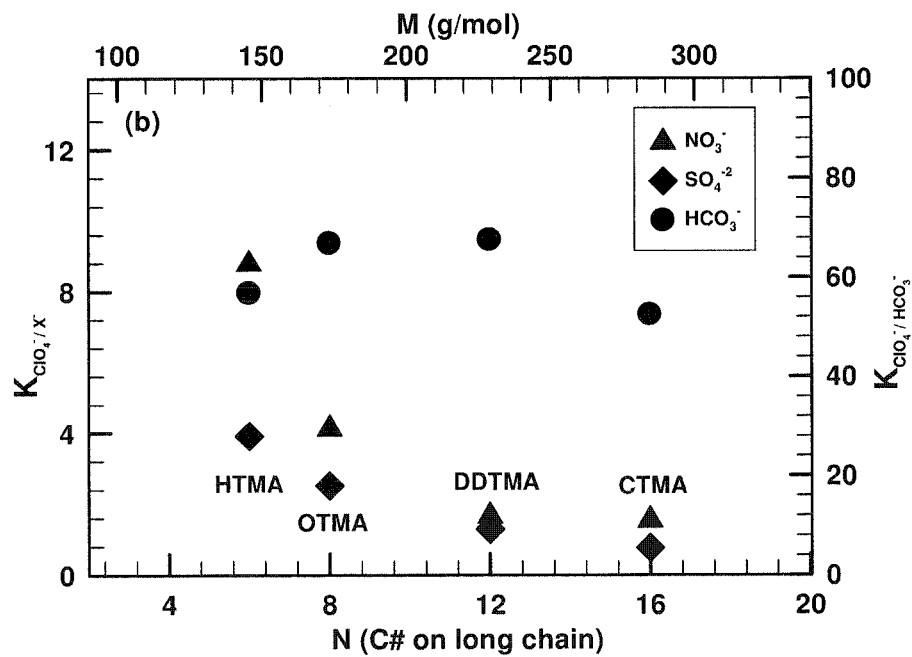
FIG. 1b amines with one long chain group and FIG. 1c amines with benzyl group. Experimental Conditions: [PVC]=34.5% (wt); [TBOAC]=59.8% (wt); [$R_4N^+X^-$]= 5.7% (wt); THF=10 mL; ED Current=1 mA; pH=6.8; temperature=22±1° C.; I=0.13 mM (NaCl).
Figure 1C:
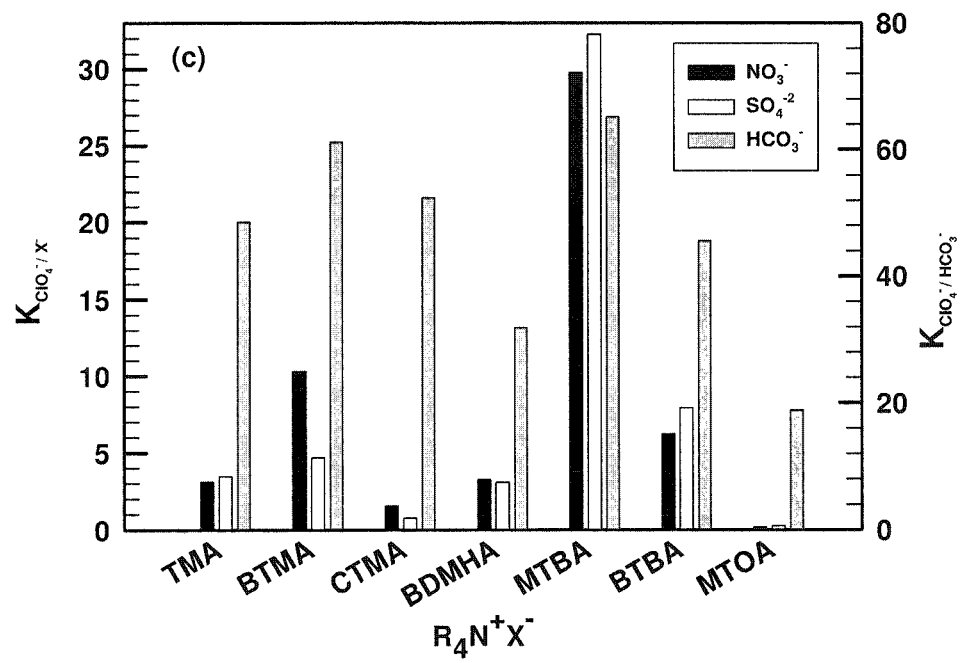
FIG. 1 contains plots of perchlorate permselectivity against nitrate, sulfate (left y-axis) and bicarbonate (right y-axis) of different membranes.
Figure 5:
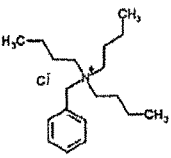
FIG. 5 shows the chemical structure of various quaternary ammonium salts.
Figure 5:
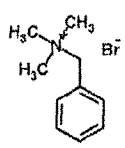
Figure 5:
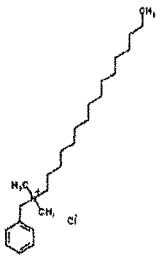
Figure 5:
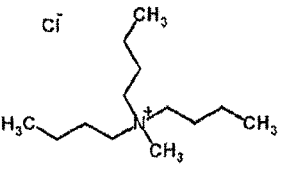
Figure 5:
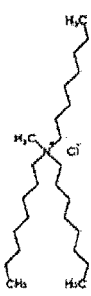

FIG. 1 shows perchlorate permselectivity versus major anions such as nitrate, sulfate (left y-axis) and bicarbonate (right y-axis) as a function of the carbon number of various quaternary ammonium salts (total of 12). The 12 $R_4N^+X^-$ functionalized membranes were divided into three distinct groups for purpose of comparison (Table 1, FIG. 5): (i) $R_4N^+X^-$ with 4 identical short-chain methyl groups, e.g., TMA (chain length=0,0,0,0)$_M$, TEA (chain length=1,1,1,1)$_M$ and TPA (chain length=2,2,2,2)$_M$ (FIG. 1a); (ii) $R_4N^+X^-$ with one long-chain R group plus three short-chain methyl group, e.g., HTMA (chain length=0,0,0,5)$_M$, OTMA (chain length=0,0,0,7)$_M$, DDTMA chain length=0,0,0,11)$_M$, CTMA (chain length=0,0,0,15)$_M$ (FIG. 1b); and (iii) $R_4N^+$ $X^-$ with one short-chain benzyl group plus one to three short-chain methyl groups, e.g., BTMA $(0,0,0)_M(1)_B$, BDMHA $(0,0,15)_M(1)_B$ and BTBA $(3,3,3)_M(1)_B$ (FIG. 1c). (Note: The figure in the parentheses stands for the number of carbon between $N^+$ and functional group such as methyl group, M, and benzyl group, B.) FIG. 1a shows that the $K_{ClO_4^-,NO_3^-}$ and $K_{ClO_4^-,SO_4^{2-}}$ values of TPA-membrane were larger than that of the TMA- and the TEA-membrane, which is believed to be due in part to the increase in steric effect contributed from the long-chain group, which promoted affinity between the membrane and the perchlorate. Although the chain length of TEA is longer than that of TMA, the perchlorate permselectivity of TEA-membrane is not better than that of TMA-membrane. Therefore, it is suggested that not only steric effect contributed from the long-chain group of amines would influence the perchlorate permselectivity. When the modifying $R_4N^+X^-$ compound has one long tail (FIG. 1b) the affinity of perchlorate toward the membrane decreases due mainly (it is believed) to the unique structure of the quaternary ammonium salts, which contain 3 short-chain and 1 long-chain alkyl groups. FIG. 1c shows the permselectivity of perchlorate as affected by the presence of benzyl group in the quaternary ammonium salts. It is noted that one of the three hydrogen atoms of the methyl group in TMA, CTMA and MTBA is replaced by a benzyl structure to become BTMA, BDMHA, and BTBA, respectively. Both TMA and BTMA have four short chains, both CTMA and BDMHA have has one long and three short chains and both MTBA and BTBA have one short and three medium-length chains. Based on perchlorate permselectivity versus nitrate and sulfate, two most competing anions, experimental results showed that the perchlorate selectivities of BTMA and BDMHA were greater than that of TMA and CTMA, respectively; whereas, the perchlorate permselectivity of BTBA was smaller than that of MTBA. The benzyl group, slightly electron withdrawing relative to hydrogen being replaced, is thought to contribute to the positive charge of the nitrogen center and enhance the electrostatic interaction between perchlorate and the membrane structure. However, in the presence of medium-length chains, namely, BTBA and MTBA, steric effects inhibit the interaction between perchlorate and the nitrogen center. It is also worthy of mention that MTOA which was used to prepare perchlorate selective electrode in a prior study showed insignificant $K_{ClO_4^-,NO_3^-}$ and $K_{ClO_4^-,SO_4^{2-}}$ values (<<1), indicating small perchlorate permselectivity.

The MTBA-containing membrane showed significantly superior perchlorate permselectivity than the BTBA-containing membrane as shown in FIG. 1c. It was found that neither the longest chain (CTMA) nor the shortest chain (TMA) $R_4N^+X^-$ functionalized membranes exhibited the maximum perchlorate permselectivity against nitrate and sulfate. In previous studies, comparable results were also observed in ion exchange resins modified with quaternary amine for perchlorate adsorption. The long-chain group of amine increased the selectivity for perchlorate but reduced the reaction kinetics, while the short-chain group showed the contrary behavior. The results can be attributed to the steric hindrance in the reaction of bulky amine groups, which was also previously observed in the nitrate selective membrane. Only amines with moderate chain length could offer sufficient steric effect for perchlorate separation and balance both the selectivity and the kinetic rate on adsorption and desorption of the perchlorate.

Table 2 (FIG. 6) summarizes the ion exchange capacity (q) of different types of membranes. PVC-only membrane (as control) showed the lowest exchange capacity due to lack of any ion exchange groups. The q values of membranes prepared with quaternary ammonium salts were in the range from 0.06 to 0.15 meq/g. The increase in ion exchange capacity by incorporation of $R_4N^+X^-$ into the PVC membrane was further confirmed by the results of FTIR analysis. In the FTIR spectra, several functional groups, such as carbonyl (C=O), methyl (—$CH_3$) and butyl (—$C_4H_9$), were observed. Since the methyl group is present in all quaternary ammonium salts, the —$CH_3$ asymmetric stretching signal at wavenumber from 2917 to 2958 $cm^{-1}$ supports the evidence that quaternary ammonium salts were successfully incorporated in the polymer structure. The shift in quaternary ammonium group peaks (e.g., —$CH_3$) can be attributed in part to structural change of the amine compound in the PVC matrix. The stretching from 1728 to 1744 $cm^{-1}$ was assigned to the C=O group present in the TBOAC used for the synthesis of the membrane. Similar FTIR spectra of PVC membranes have been observed in previous studies. It has been reported that the shift of the vibration signals from the organic acids functionalized PVC membrane were the result of interaction between the organic acids and PVC.

Surface Hydrophilicity

Membrane surfaces noticeably exhibited affinity toward water. A previous study concluded that the permeation of halogen ions through the ion exchange membrane in electrodialysis can be altered by controlling the hydrophilicity of the membranes. Therefore, the surface hydrophilicity of the membrane controls the permselectivity.

Table 2 (FIG. 6) summarizes the contact angle value of 13 fresh membranes. The contact angle of eight membranes (i.e., PVC alone, membranes containing TMA, TEA, BTMA, OTMA, MTBA, BTBA and BDMHA) were between 60 and 80 deg, while the rest of the other five membranes (i.e., containing HTMA, TPA, DDTMA, CTMA and MTOA) were ≤ca. 50 deg. The higher the contact angle the more hydrophobic the surface is. It is worthy of mention that CTMA membrane has the smallest contact angle value (i.e., 3.7 deg) among all membranes studied and is thus the most hydrophilic. The contact angle of all, except the PVC-only, membranes (a control) was increased (i.e., becoming more hydrophobic) upon being used for the treatment of perchlorate containing solution. That is, perchlorate adsorption by the membrane rendered the membrane surface hydrophobic. In general, the change of contact angle after and before use of most of the membranes was less than 10 deg indicating the adsorption of small amounts of perchlorate. It must be noted that the MTOA-containing membrane displayed the greatest change of contact angle (>30 deg) among all 13 membranes studied, which implies strong perchlorate adsorption onto the membrane. That is, the MTOA-membrane attracted perchlorate ions strongly but barely released it to the bulk solution. In contrast, the contact angle of the MTBA-containing membrane only increased by 5.6 deg, which implies effective passage of perchlorate molecule across the membrane as reflected by a $K_{ClO_4^-,X^-}$ value larger than that of all other functionalized membranes. Therefore, the MTBA-containing membrane appeared to the best perchlorate permselective membrane.

Surface Morphology

Previous workers have reported that the surface morphology could influence the salt separation efficiency of a membrane. Therefore, several morphology related factors such as surface roughness ($\delta$), pore radius ($r_p$) and specific surface area, $\Sigma$, were examined (Table 2, FIG. 6) in addition to surface images using scanning electron microscope (SEM). The surface roughness ($\delta$) of the PVC-only membrane was 3.21±0.06 nm, which surface was considered smooth. Incorporation of inorganic or organic salts into the membrane structure increased the surface roughness from 3.2 to 41.3 nm (Table 2, FIG. 6). Incomplete incorporation of the organic salts in the structure of the polymer membranes could lead to increase in surface roughness. Similarly, incorporation of quaternary amine salts increased the membrane pore size. PVC-only membrane showed the smallest average pore radius ($r_p$) at 40.3 Å; whereas the average pore radius of functionalized membranes was in the range of 77.7 to 90.6 Å. The quaternary ammonium salts would occupy the intermolecular space in the polymer structure, thereby hindering the polymer film formation process. Intuitively, uncompleted polymerization could lead to loose structures of large pores. It is noted that although the pore size of all membranes was relatively greater than the hydration radius of all anions studied, functionalized membranes still demonstrated superior perchlorate permselectivity. Hence, the pore size appears to play a minor role in determining perchlorate permselectivity. The specific surface area ($\Sigma$) of all membranes was in the range of 0.12 to 0.79 m$^2$/g, which was small compared to most perchlorate adsorbents such as activated carbon. Therefore, specific surface could not be a major factor controlling perchlorate adsorption capacity, which is closely related to permselectivity.

Figure 2:
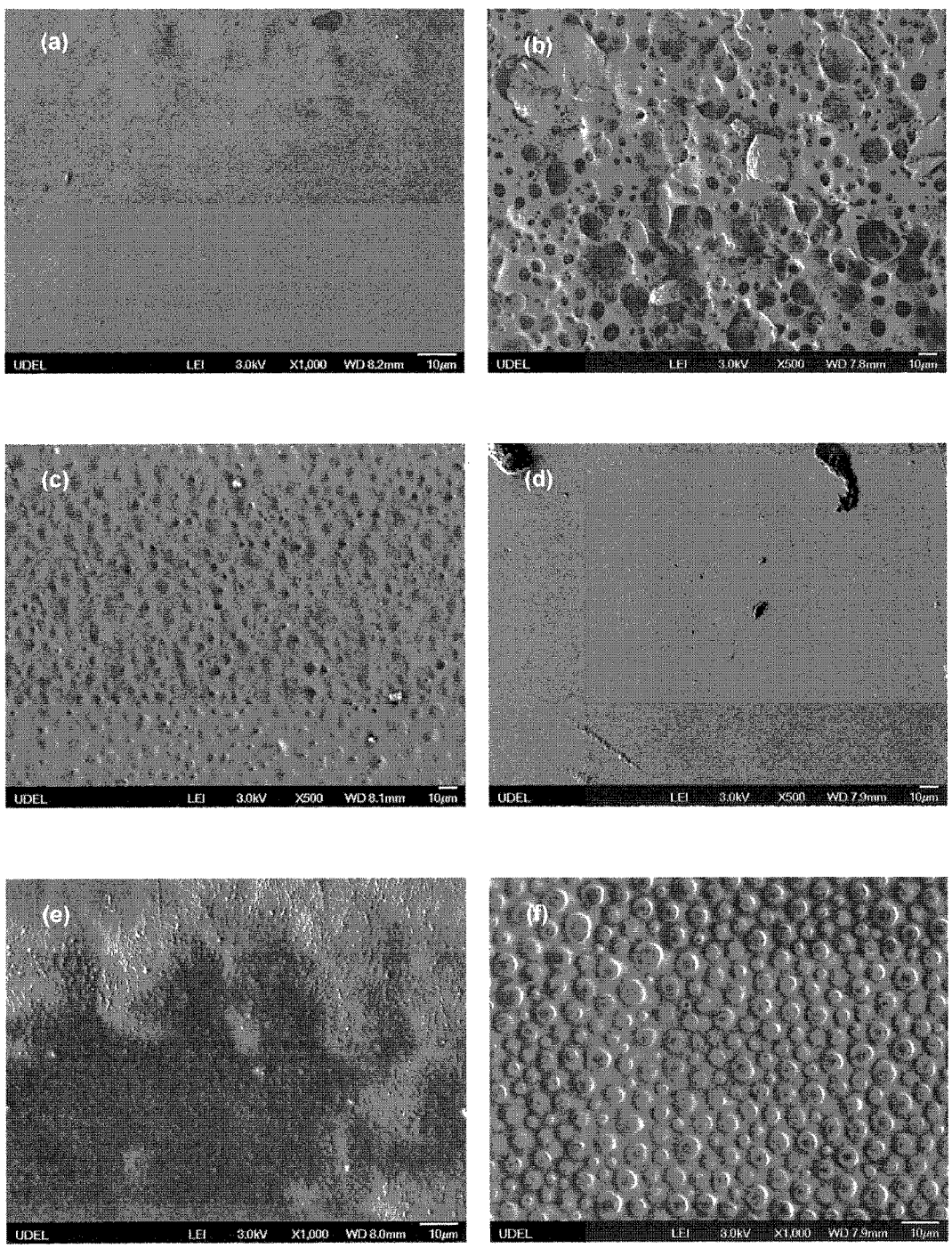
FIG. 2 shows SEM images of various membranes.

SEM images (FIG. 2) of PVC-, TMA-, CTMA-, BTMA-, MTOA- and MTBA-containing membrane surfaces showed that the features of the membrane surface changed as the membrane was modified with different types of quaternary amine salts. For example, for an $R_4N^+X^-$ salt with 4 identical short-chain alkyl groups, a TMA-containing membrane showed several layers of porous structure which is not observed in the TEA- and TPA-containing membranes. For $R_4N^+X^-$ with one long-chain group plus three short-chain groups, CTMA-, OTMA- and DDTMA-containing membranes all showed dent-like features. The size of the dents was in the range of ca. 1 to 10 µm. When $R_4N^+X^-$ has one benzyl group, the surface of the resulting membrane (BTMA, BTBA and BDMHA) appeared relatively smooth without obvious dents or pores. In addition, MTOA-containing membrane showed tiny bumps (<1 µm) on its surface. The surface of the MTBA-containing membrane showed numerous nodule-like features having a size in the range of ca. 2 to 6 µm. However, no such nodules-like features were observed in other membranes. It is also interesting to note that the variation of the surface roughness of the MTBA-containing membrane ($\delta$=3.23±2.58 nm) was larger than that of most of the other membranes. Therefore, it is suggested that the nodule-like features contributed to large surface roughness.

The cross sectional structure of the membrane was observed using scanning electron microscope (SEM) exemplified by the MTBA-membrane. The MTBA-containing membrane again had nodule-like features inside of its structure. Consequently, it is believed that these inner nodule-like features may be responsible for the ion exchange process of anion transport across the membrane under electrostatic field. Further investigation may be needed to characterize the chemical composition of the nodule-like features. The thickness of the membrane measured by SEM was about 326 µm, which is close to the value obtained from the amount of materials used in the preparation of the membrane (300 µm).

Perchlorate Separation

Figure 3A:
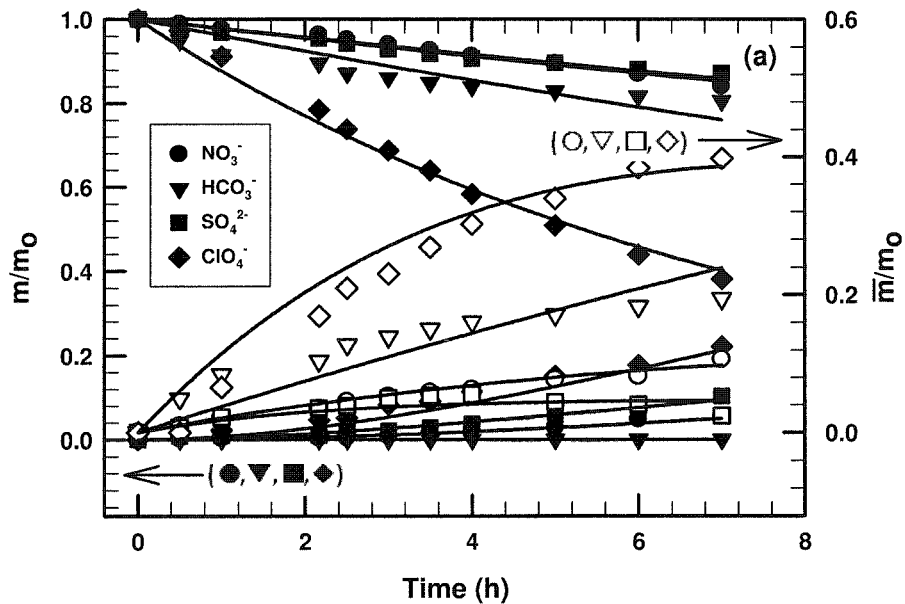
FIG. 3a: Typical data on the separation of perchlorate between the dilute and the concentrated streams under electrical exemplified by the MTBA-membrane. Anion transport rate constant, $k_1$, as a function of carbon chain length for quaternary ammonium salts with (FIG. 3b) 4 identical short-chain methyl groups, (FIG. 3c) 1 long-chain and 3 methyl groups and (FIG. 3d) the presence of benzyl group. Experimental conditions: [Alkalinity]=15 mg/L as $CaCO_3$ (0.15 mM); [$NO_3^-$]=10 mg/L (0.16 mM); [$SO_4^{2-}$]=4.3 mg/L (4.5×10$^{-2}$ mM); [$ClO_4^-$]=1.0 mg/L (1.0×10$^{-2}$ mM). Temperature=21~23° C.; pH=5~7; ED current=1 mA.
Figure 3B:
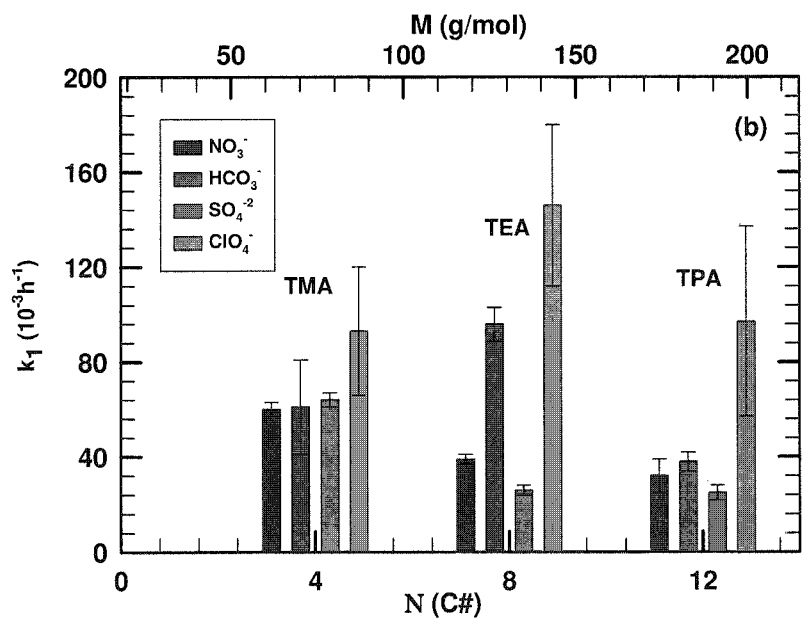
FIG. 3 shows the electrodialytic separation of perchlorate from water containing major anions, namely $NO_3^-$, $SO_4^{2-}$ and $HCO_3^-$ with various membranes.

FIG. 3a shows the electrodialytic separation (constant current operation) of perchlorate (diamonds) from water containing major anions, namely $NO_3^-$ (circles), $SO_4^{2-}$ (squares) and $HCO_3^-$ (inverted triangles) with MTBA-containing membranes. The black, gray and the open symbols represent the mass of anions in the diluate, the concentrate, and the membrane, correspondingly. The initial concentrations of perchlorate, nitrate, sulfate and bicarbonate were 1, 10, 4.3 and 9.15 mg/L in the diluate, respectively. The solid lines represent the fitted transport kinetics of anions across the membrane based on the calculated $k_1$ and $k_2$ values. With the MTBA-containing membrane, 60% of perchlorate was separated from the diluate within 7 hours while only less than 9% of other anions appeared in the concentrate. Results of functionalized membranes on perchlorate separation with ED (electrodialysis) are also shown in FIG. 3b. Again, the results were compared by dividing into three groups based on the types of functional groups. FIG. 3b shows the $k_1$ values of anions of TMA-, TEA- and TPA-containing membranes. Using Turkey's test, there are no significant ($\alpha$=0.05) differences of $k_1$ values of perchlorate in the three membranes. However, $k_1$ values of sulfate and nitrate in TMA membrane were larger than that of TPA system with p-values <0.0001 and 0.0384, respectively. For amines with one long chain group, no significant difference of $k_1$ values of anion among the examined membranes was observed.

Figure 3C:
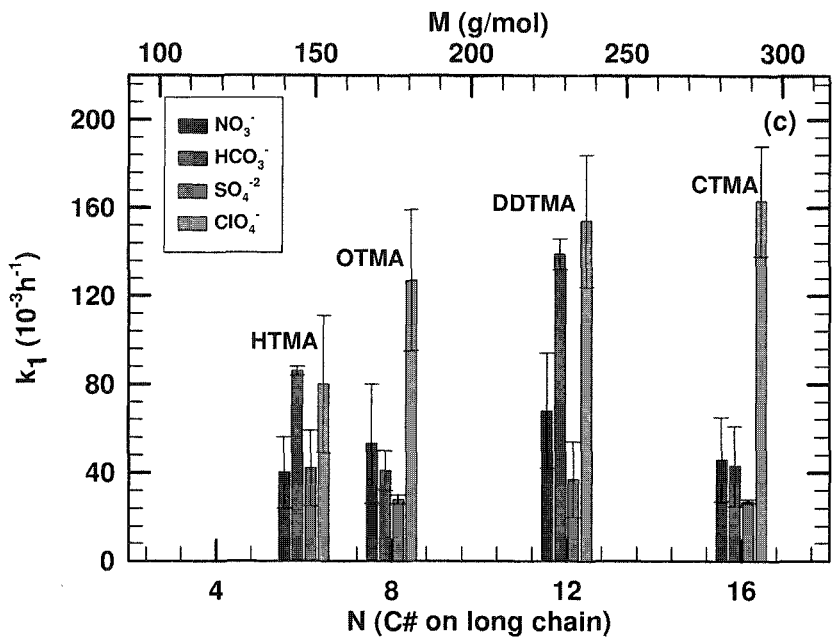
Figure 3D:
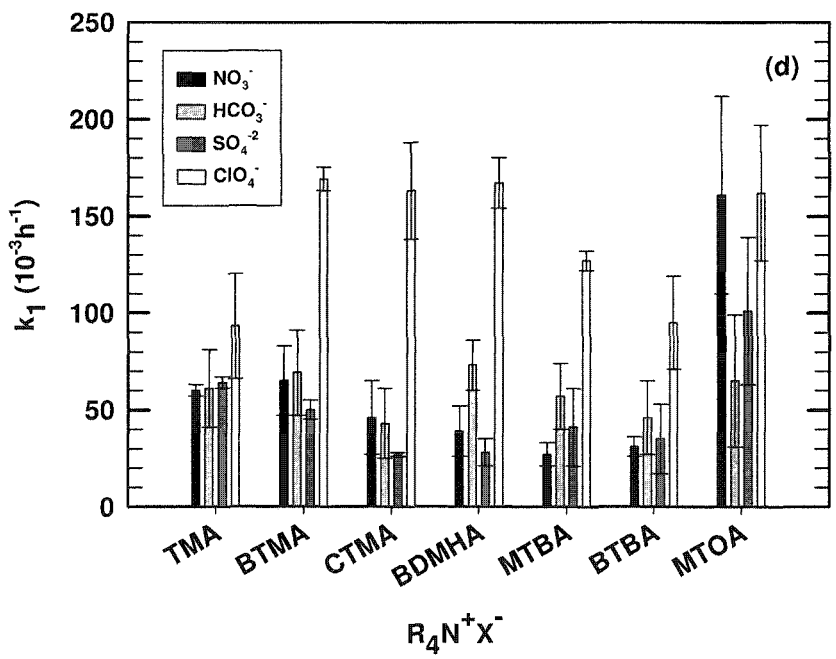
Figure 4A:
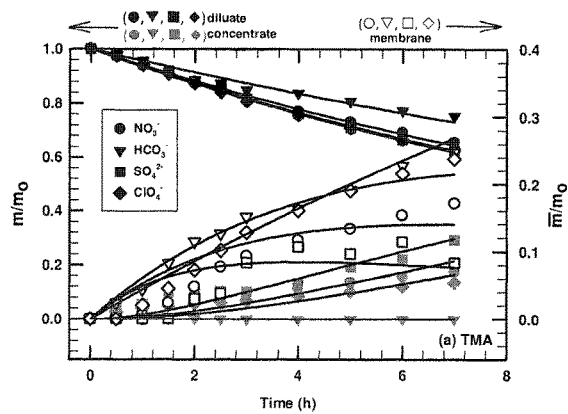
FIG. 4a TMA.
Figure 4B:
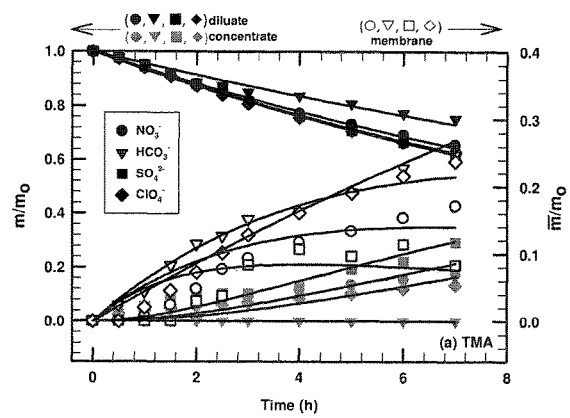
FIG. 4b TEA.
Figure 4C:
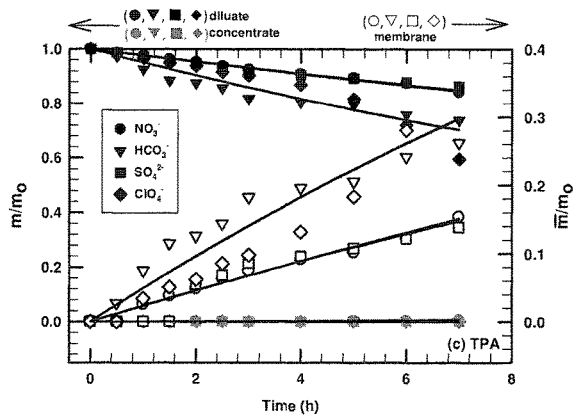
FIG. 4c TPA.
Figure 4D:
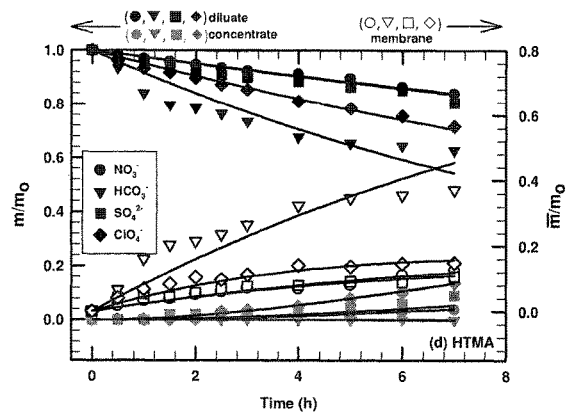
FIG. 4d HTMA.
Figure 4E:
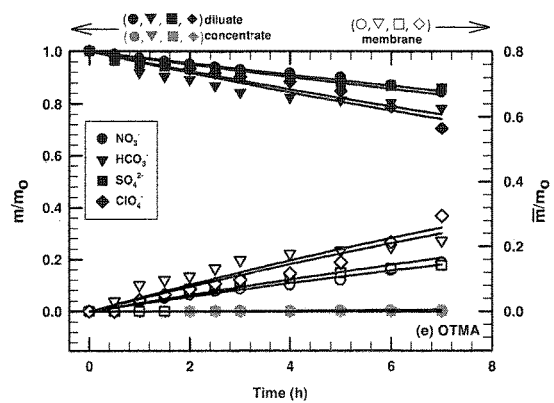
FIG. 4e OTMA.
Figure 4F:
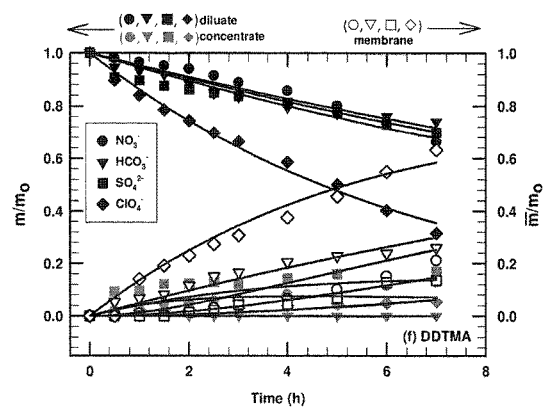
FIG. 4f DDTMA.
Figure 4G:
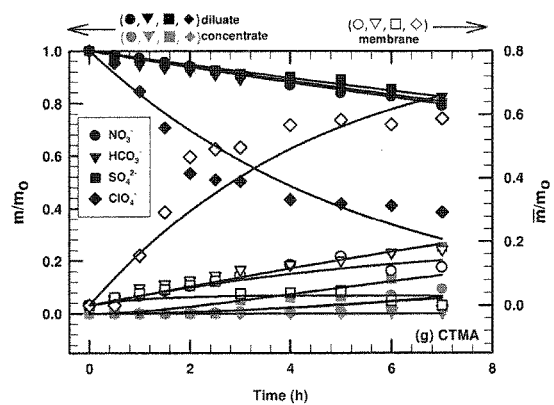
FIG. 4g CTMA.
Figure 4H:
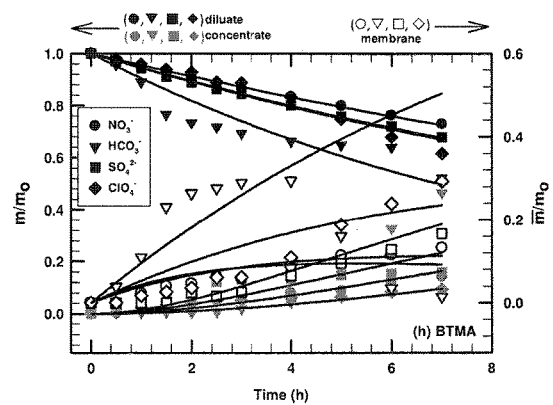
FIG. 4h BTMA.
Figure 4I:
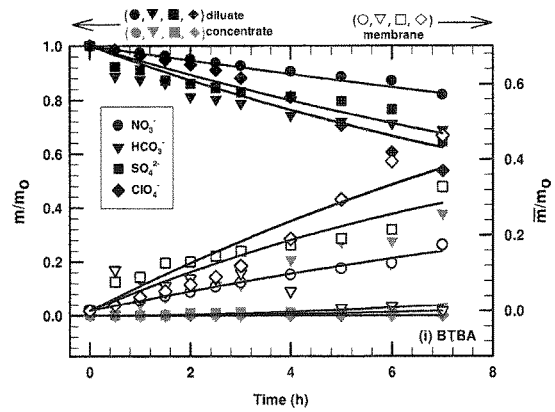
FIG. 4i BTBA.
Figure 4J:
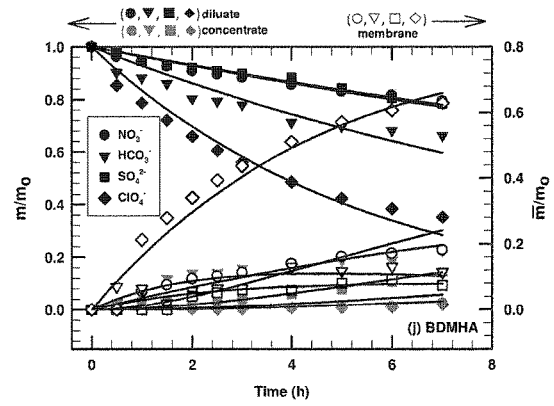
FIG. 4j BDMHA and FIG. 4k MTOA. [Alkalinity]=15 mg/L as $CaCO_3$ (3 mg/L); [$NO_3^-$]=10 mg/L; [$SO_4^{2-}$]=4.3 mg/L; [$ClO_4^-$]=1.0 mg/L. Experimental conditions: Temperature=21~23° C.; pH=5~7; ED current=1 mA.
Figure 4K:
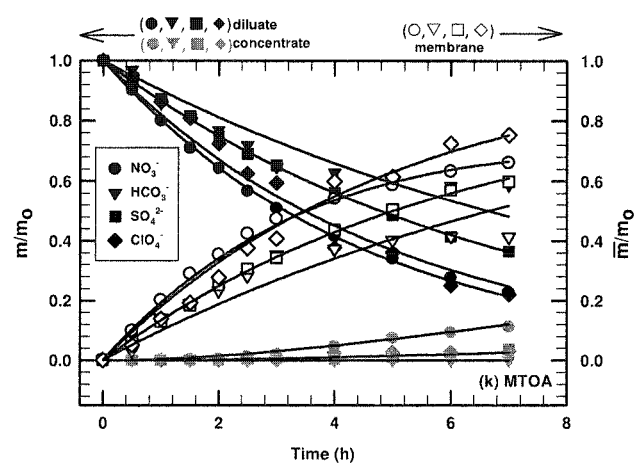
FIG. 4 shows the electrodialytic separation of perchlorate from water containing major anions, namely $NO_3^-$, $SO_4^{2-}$ and $HCO_3^-$ with different membranes.

FIG. 3c shows that the $k_1$ values of perchlorate of BTMA-containing membrane is significant ($\alpha$=0.05) different from that of TMA membrane with p-value 0.0114. Overall, membranes modified with benzyl groups containing amines, such as BTMA, BDMHA and BTBA showed comparable $k_1$ value of perchlorate ion with that of MTBA membrane. In addition, MTOA and CTMA also showed larger of perchlorate ion than that of MTBA membrane (FIG. 3d). However, from ED experiments results (FIG. 4g-k), perchlorate could not pass through the membranes only possessing large $k_1$ values, effectively. For example, it was found that perchlorate was retained in the MTOA-membrane as mentioned above (contact angle experiments). Although the MTOA membrane could separate about 80% of perchlorate from the diluate, no detectable concentration of perchlorate was found in the concentrate stream indicating the small $k_2$ value of perchlorate of the MTOA-containing membrane. Moreover, it was shown that the CTMA-containing membrane had the smallest contact angle among all membranes studied. The highly hydrophilic characteristics of the CTMA-containing membrane would hinder the passage of the perchlorate ion across the membranes. Table 3 (FIG. 7) summarizes the calculated rate constants ($k_1$ and $k_2$) of anions across different membranes in the ED system. The $k_2$ value of perchlorate of MTBA membrane is larger than that of BTMA, BDMHA, BTBA and MTOA membrane. Therefore, both $k_1$ and $k_2$ values would influence on the preferential separation of perchlorate over the other anions. The MTBA-functionalized PVC membrane was capable of separating perchlorate from other major anions in water effectively.

What is claimed is:

1. A membrane useful for selectively separating perchlorate ions from aqueous compositions, comprising at least one polymeric matrix material and at least one quaternary ammonium salt, wherein the at least one quaternary ammonium salt is a salt of a quaternary ammonium having four alkyl groups attached to a nitrogen atom and wherein the four alkyl groups are the same or different and contain a total of 12 to 14 carbon atoms, subject to the proviso that none of the alkyl groups individually contain more than six carbon atoms.

2. The membrane of claim 1, wherein the at least one polymeric matrix material includes at least one vinyl chloride polymer.

3. The membrane of claim 1, wherein the at least one polymeric matrix material includes a homopolymer of vinyl chloride.

4. The membrane of claim 1, wherein the at least one quaternary ammonium salt is a halide salt.

5. The membrane of claim 1, wherein the at least one quaternary ammonium salt is a chloride or bromide salt.

6. The membrane of claim 1, wherein the at least one quaternary ammonium salt includes one or more quaternary ammonium salts selected from the group consisting of tetrapropylammonium chloride and methyltributylammonium chloride.

7. The membrane of claim 1, wherein the membrane is additionally comprised of at least one plasticizer.

8. The membrane of claim 7, wherein the at least one plasticizer includes at least one non-phthalate plasticizer.

9. The membrane of claim 7, wherein the at least one plasticizer includes tributyl O-acetyl citrate.

10. The membrane of claim 1, comprising 30 to 40 weight % vinyl chloride polymer, 55 to 65 weight % plasticizer, and 2 to 10 weight quaternary ammonium salt.

11. The membrane of claim 1, wherein the membrane has a thickness of 0.12 to 0.60 mm.

12. The membrane of claim 1, wherein the membrane has an averaged pore radius of 70 to 95 angstroms.

13. The membrane of claim 1, wherein the membrane has an ion exchange capacity of at least 0.05 meq/g.

14. An electrodialysis unit useful for removing perchlorate from an aqueous composition, comprising a membrane in accordance with claim 1 and a system for producing an electrical charge across the membrane.

15. The electrodialysis unit of claim 14, wherein the system for producing an electrical charge across the membrane comprises an anode and a cathode.

16. The electrodialysis unit of claim 15, additionally comprising a first cation exchange membrane positioned between the anode and the membrane and a second cation exchange membrane positioned between the cathode and the membrane.

17. An electrodialysis unit, comprising one or more electrode stacks, each electrode stack including two electrodes and one or more cation exchange membranes and anion exchange membranes alternately arranged between the two electrodes, at least one of the anion exchange membranes being a membrane comprising at least one polymeric matrix material and at least one quaternary ammonium salt wherein the at least one quaternary ammonium salt is a salt of a quaternary ammonium having four alkyl groups attached to a nitrogen atom and wherein the four alkyl groups are the same or different and contain a total of 12 to 14 carbon atoms, subject to the proviso that none of the alkyl groups individually contain more than six carbon atoms.

18. A method for separating perchlorate from an aqueous composition comprised of perchlorate, wherein the method comprises placing the aqueous composition in contact with a surface of a membrane in accordance with claim 1 in an electrodialysis unit comprising a system for producing an electrical charge across the membrane and applying a current between the anode and the cathode.

19. A method of making a membrane in accordance with claim 1, comprising forming a layer of a solution comprised of quaternary ammonium salt, polymeric matrix material and, optionally, plasticizer on a surface of a substrate and drying the layer to obtain the membrane.

* * * * *